United States Patent
Akiya et al.

(10) Patent No.: US 9,686,181 B2
(45) Date of Patent: Jun. 20, 2017

(54) SELECTIVE SERVICE BYPASS IN SERVICE FUNCTION CHAINING

(71) Applicant: CISCO TECHNOLOGY, INC., San Jose, CA (US)

(72) Inventors: Nobushige Akiya, Kanata (CA); Nagendra Kumar Nainar, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 14/508,570

(22) Filed: Oct. 7, 2014

(65) Prior Publication Data

US 2016/0099864 A1    Apr. 7, 2016

(51) Int. Cl.
  *H04L 12/703* (2013.01)
  *H04L 12/723* (2013.01)
  *H04L 12/823* (2013.01)
  *H04L 12/741* (2013.01)
  *H04L 12/851* (2013.01)

(52) U.S. Cl.
  CPC .............. *H04L 45/28* (2013.01); *H04L 45/50* (2013.01); *H04L 45/74* (2013.01); *H04L 47/24* (2013.01); *H04L 47/32* (2013.01)

(58) Field of Classification Search
  CPC ......... H04L 45/28; H04L 47/32; H04L 45/74; H04L 41/0654; H04L 45/50; H04L 67/327; H04L 67/2833; H04L 45/124; H04L 45/306; H04L 45/02; H04L 45/38; H04L 45/22; H04L 67/1097; H04L 45/04
  See application file for complete search history.

(56) References Cited

U.S. PATENT DOCUMENTS

| | | | |
|---|---|---|---|
| 9,038,151 B1 * | 5/2015 | Chua | H04L 45/02 709/223 |
| 9,185,170 B1 * | 11/2015 | Grammel | H04L 67/141 |
| 2011/0235645 A1 * | 9/2011 | Sardar | H04L 67/1097 370/395.53 |
| 2013/0227071 A1 | 8/2013 | Valluri et al. | |
| 2013/0343174 A1 * | 12/2013 | Guichard | H04L 45/22 370/218 |
| 2013/0346629 A1 | 12/2013 | Wang et al. | |
| 2015/0092551 A1 * | 4/2015 | Moisand | H04L 12/4633 370/235 |
| 2016/0028640 A1 * | 1/2016 | Zhang | H04L 47/33 370/389 |

(Continued)

OTHER PUBLICATIONS

IETF Draft "IPv6 Segment Routing Header (SRH), draft-previdi-6man-segment-routing-header-01", S. Previdi et al., Jun. 9, 2014.

(Continued)

*Primary Examiner* — Charles C Jiang
*Assistant Examiner* — Rose Clark
(74) *Attorney, Agent, or Firm* — Cindy Kaplan (57) ABSTRACT

In one embodiment, a method includes identifying a failure of a service function at a service node in a service chain, receiving a packet at the service node, and processing the packet at the service node according to a flag associated with the service function and set based on a criticality of the service function. An apparatus is also disclosed herein.

20 Claims, 9 Drawing Sheets

(56) References Cited

U.S. PATENT DOCUMENTS

2016/0050131 A1* 2/2016 Zhang ................ H04L 43/0811
370/244

OTHER PUBLICATIONS

IETF Draft "Network Service Header", draft-quinn-sfc-nsh-03.txt, P. Quinn et al., Jul. 3, 2014.
IETF Draft "Segment Routing Use Cases", draft-filsfils-spring-segment-routing-use-cases-00, C. Filsfils et al., Mar. 27, 2014.
IETF Draft "Segment Routing with MPLS data plane", draft-filsfils-spring-segment-routing-mpls-02, C. Filsfils et al., Jun. 6, 2014.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Next Header   | Hdr Ext Len   | Routing Type  | Next Segment  |
+-+-+-+-+-+-+-+-+-+-+-+-+-+-+-+-+-+-+-+-+-+-+-+-+-+-+-+-+-+-+-+-+
| Last Segment  | Flags | HMAC Key ID | Policy List Flags       |
+-+-+-+-+-+-+-+-+-+-+-+-+-+-+-+-+-+-+-+-+-+-+-+-+-+-+-+-+-+-+-+-+
|                                                               |
|              Segment List[0] (128 bits ipv6 address)          |
|                                                               |
+-+-+-+-+-+-+-+-+-+-+-+-+-+-+-+-+-+-+-+-+-+-+-+-+-+-+-+-+-+-+-+-+
|                                                               |
|                              ...                              |
|                                                               |
+-+-+-+-+-+-+-+-+-+-+-+-+-+-+-+-+-+-+-+-+-+-+-+-+-+-+-+-+-+-+-+-+
|                                                               |
|              Segment List[n] (128 bits ipv6 address)          |
|                                                               |
+-+-+-+-+-+-+-+-+-+-+-+-+-+-+-+-+-+-+-+-+-+-+-+-+-+-+-+-+-+-+-+-+
|                                                               |
|              Policy List[0] (128 bits ipv6 address)           |
|                            (optional)                         |
+-+-+-+-+-+-+-+-+-+-+-+-+-+-+-+-+-+-+-+-+-+-+-+-+-+-+-+-+-+-+-+-+
|                                                               |
|              Policy List[1] (128 bits ipv6 address)           |
|                            (optional)                         |
+-+-+-+-+-+-+-+-+-+-+-+-+-+-+-+-+-+-+-+-+-+-+-+-+-+-+-+-+-+-+-+-+
|                                                               |
|              Policy List[2] (128 bits ipv6 address)           |
|                            (optional)                         |
+-+-+-+-+-+-+-+-+-+-+-+-+-+-+-+-+-+-+-+-+-+-+-+-+-+-+-+-+-+-+-+-+
|                                                               |
|              Policy List[3]  (Forward Flag Mask)              |
|                            (optional)                         |
+-+-+-+-+-+-+-+-+-+-+-+-+-+-+-+-+-+-+-+-+-+-+-+-+-+-+-+-+-+-+-+-+
|                                                               |
|                        HMAC (256 bits)                        |
|                            (optional)                         |
+-+-+-+-+-+-+-+-+-+-+-+-+-+-+-+-+-+-+-+-+-+-+-+-+-+-+-+-+-+-+-+-+
```

SELECTIVE SERVICE BYPASS IN SERVICE FUNCTION CHAINING

TECHNICAL FIELD

The present disclosure relates generally to communications networks, and more particularly, to service function chaining.

BACKGROUND

Network services are widely deployed and important in many networks. Services provide a range of features such as security, wide area network acceleration, firewall, server load balancing, deep packet inspection, intrusion detection service, and Network Address Translation (NAT). Network services may be employed at different points in a network infrastructure, including for example, wide area network, data center, campus, and the like. The services may be applied as part of a service chain.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises identifying a failure of a service function at a service node in a service chain, receiving a packet at the service node, and processing the packet at the service node according to a flag associated with the service function and set based on a criticality of the service function.

In another embodiment, an apparatus generally comprises a processor for identifying a failure of a service function at the apparatus, and processing a packet received at the apparatus according to a flag associated with the service function and set based on a criticality of the service function. The apparatus further comprises an interface for transmitting packets in a service chain.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A service chain is a data structure defining a set of service nodes hosting various service functions and the order in which the service functions should be applied to the data of selected traffic. Service chaining involves the interception of traffic and directing of traffic through a series of service nodes (i.e., physical or virtual devices) that each support one or more service functions. Service chaining may be used, for example, in a Network Service Header (NSH) dataplane, Segment Routing (SR)/IPv6 dataplane, or SR/MPLS (Multiprotocol Label Switching) dataplane.

Network service header is a dataplane header added to frames/packets. The header contains information used for service chaining, as well as metadata added and consumed by network nodes and service elements. NSH may be used across a range of devices, both physical and virtual. In one example, NSH may be implemented as described in IETF draft "Network Service Header", P. Quinn et al., Jul. 3, 2014.

Segment routing (SR) allows a node to steer a packet through a set of segments. Rather than depending on a hop-by-hop signaling technique, SR depends on a set of segments that are advertised by a routing protocol. These segments act as topological sub-paths that can be combined together to form a desired path. Segment routing allows for a flexible definition of end-to-end paths within routing protocols by encoding paths as sequences of topological sub-paths referred to as segments. Segment routing may be used for service chaining as described, for example, in ITEF draft "Segment Routing Use Cases, C. Filsfils et al., Mar. 27, 2014. IETF draft "IPv6 Segment Routing Header (SRH), S. Previdi et al., Jun. 9, 2014 is an example that defines IPv6 dataplane of segment routing (IPv6-SR). IETF draft "Segment Routing with MPLS data plane", C. Filsfils, Jun. 6, 2014 describes one example of an implementation of MPLS dataplane for segment routing (MPLS/SR).

In conventional service chaining with NSH dataplane or IPv6-SR dataplane, when one of the service functions is not available due to recent failure, for example, the nodes in the service chain do not know how to treat packets. In conventional service chaining with MPLS, when one of the service functions is not available, the entire packet is dropped. If the service function is very critical to traffic (e.g., firewall, NAT (Network Address Translation), etc.), it is reasonable to drop the packet. However, when the failed service is not critical or only informational (e.g., monitoring, accounting, billing, or experimental, etc.), the packet does not need to be dropped.

The embodiments described herein provide an indicator (e.g., flag) in the dataplane (e.g., packet header, service table) to indicate if the packet should be dropped or forwarded based on criticality of the failed service function. This allows for failure of non-critical services without impacting traffic flow. Certain embodiments provide improved uptime and increased flexibility and control. A network operator or administrator may, for example, make a decision as to whether a service or application is critical for traffic flow. In one or more embodiments, the network operator may instruct the action to be performed in the packet itself without the need for per-service standardization.

Figure 1:
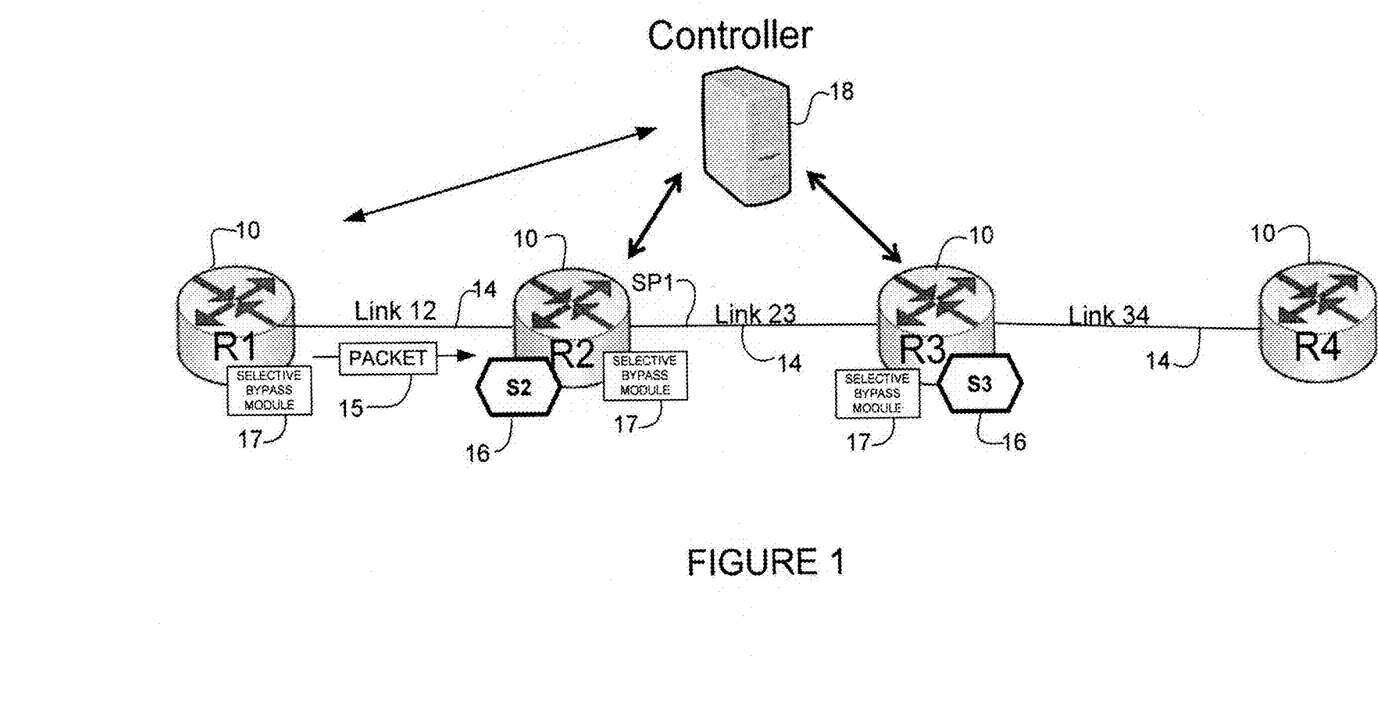
FIG. 1 illustrates an example of a network in which embodiments described herein may be implemented.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, controllers, gateways, or other network devices), which facilitate passage of data within the network.

The network shown in the example of FIG. 1 includes a plurality of network devices 10 (e.g., routers R1, R2, R3, R4) connected by links 14 (link 12, link 23, link 34). The term 'router' as used herein may refer to any network device (e.g., router, switch/router) configured to perform routing functions. In the example of FIG. 1, a service chain (service path SP1) includes an ingress node (R1), service nodes (R2, R3), and egress node (R4). The routers 10 may be located in one or more networks and may include edge routers and core routers. For example, one or more of the service nodes (R2, R3) may be located in a different network from the other service node. The network may include any number of edge devices or intermediate (core) nodes (e.g., routers, switches, access layer devices, aggregation layer devices, gateways, or other network devices). There may also be any number of network devices interposed between the nodes shown in FIG. 1.

The service nodes R2, R3 each host or support one or more service functions 16 (S2, S3 respectively in FIG. 1) for application to the payload of traffic passing through the respective service node. The service function 16 is responsible for specific treatment of received packets and may operate at the network layer or other OSI (Open Systems Interconnection) layer. The service function 16 may be a virtual instance or embedded in a physical network element. For example, the service node may be a physical device that hosts one or more service functions and has one or more network locators associated with it for reachability and service delivery. Examples of service nodes include firewalls, load-balancers, deep packet inspectors, or other nodes that perform one or more functions including, for example, security, wide area network acceleration, server load balancing, intrusion detection, network address translation, and the like. Multiple service functions may be embedded in the same network element. The service function 16 may also be performed at another node in communication with the service node.

One or more of the routers 10 may communicate with a controller 18 (e.g., ODL (open daylight) controller, SDN (software-defined networking) controller, or other centralized server). The controller 18 may be a physical device or a virtual element, and may be located at one network device or distributed throughout the network at different network devices in communication with one another or a central controller, for example. The controller 18 (or another network device) may include service chaining logic that defines one or more service chains.

In certain embodiments, the dataplane for service chaining is defined in a network service header (NSH). The embodiments may operate over VxLAN (Virtual Extensible LAN), Transmission Control Protocol (TCP), UDP (User Datagram Protocol), or any other transport.

As described further below with respect to certain embodiments, the routers 10 may be configured to perform segment routing, which specifies a path that a packet will take through the network using a stack of segment identifiers. Segment routing may be applied to an IPv6 (Internet Protocol version 6) network, for example.

In certain embodiments, the routers 10 may be located in an MPLS (Multiprotocol Label Switching) network, in which packets are transmitted via a label switched path (LSP). Packets may enter the MPLS network via an ingress label edge router (LER), travel along an LSP of one or more core LSRs (Label Switch Routers), and exit via an egress LER. Segment routing may be directly applied to the MPLS data plane.

In one or more embodiments (e.g., NSH, SR-IPv6) a flag may be set within packet 15 to indicate an action to be taken (e.g., drop packet, forward packet, or other action) at a downstream service node if there is a failure of a service function 16 at the service node, based on criticality of the service.

In one or more embodiments (e.g., MPLS) a flag may be set in a local service table at the service node to indicate an action to be taken (e.g., drop packet, forward packet, or other action) if there is a failure of a service function 16 at the service node.

The terms 'flag', 'forward flag', 'bypass flag', 'drop flag', or 'continue flag' as used herein refer to any type of indicator that may be used to identify an action to be taken upon receiving a packet at a service node with a failed service function. As described further below, the flag may comprise, for example, bits in a network service header, a policy list in a segment routing header, an entry in a forwarding table, or any other indicator that may be inserted (encapsulated) in the packet 15 or inserted into a data structure.

One or more of the routers 10 may include a selective bypass module 17 operable to identify an action to be taken at a service node upon failure of a service function 16. The selective bypass module 17 may be configured, for example, to insert the flag into the packet 15 or forwarding table or identify an action to be taken (e.g., policy) upon failure of a service function at the service node based on the flag.

It is to be understood that the term 'failure' as used herein with respect to a service function may refer to an unavailable service function or a service function that is available, but opted to be bypassed for other reasons (e.g., not operating properly, to adhere to SLA (Service Level Agreement), minimize delay, or other policy).

It is to be understood that the network shown in FIG. 1 is only an example and the embodiments described herein may be implemented in networks comprising different network topologies or network devices, or using different network protocols, without departing from the scope of the embodiments.

Figure 2:
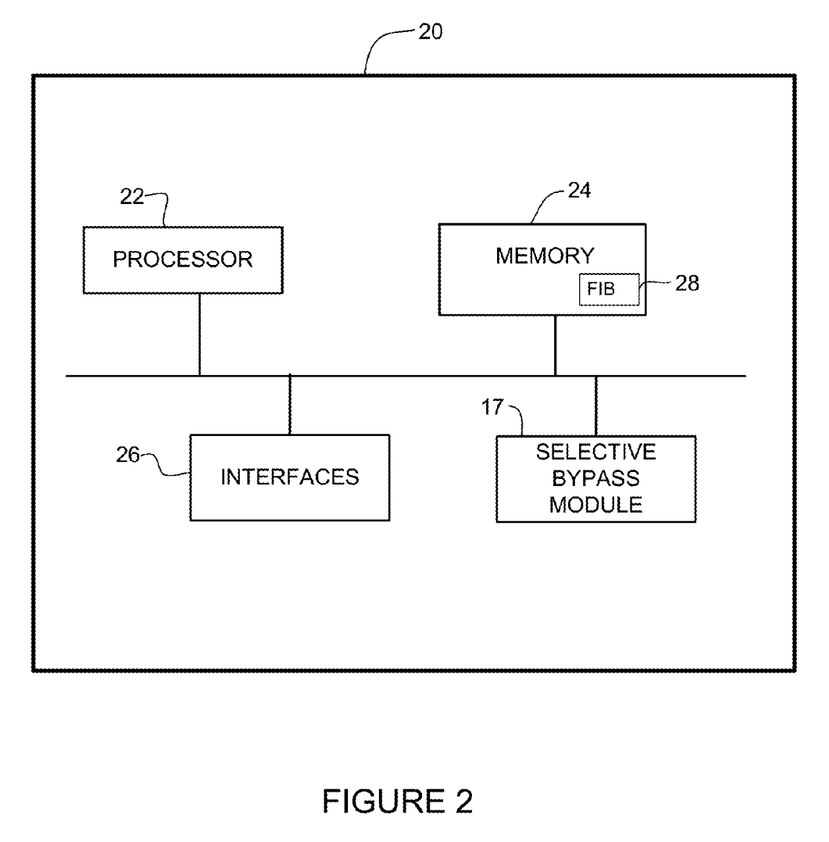
FIG. 2 depicts an example of a network device useful in implementing embodiments described herein.

FIG. 2 illustrates an example of a network device 20 (e.g., router 10 in FIG. 1) that may be used to implement the embodiments described herein. In one embodiment, the network device is a programmable machine that may be implemented in hardware, software, or any combination thereof. The network device 20 includes one or more processor 22, memory 24, network interfaces 26, and selective bypass module 17.

Memory 24 may be a volatile memory or non-volatile storage, which stores various applications, operating systems, modules, and data for execution and use by the processor 22. For example, components of selective bypass module 17 (e.g., code, logic, software, firmware, etc.) may be stored in memory 24. Memory 24 may also store one or more forwarding tables 28 (e.g., local service table, FIB (Forwarding Information Base), LFIB (Label FIB), and the like).

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interfaces 26 may comprise any number of interfaces (linecards, ports) for receiving data or transmitting data to other devices. As shown in FIG. 1, R1, R2, and R3 each comprise at least one interface for transmitting packets on the service chain. The network interface 26 may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
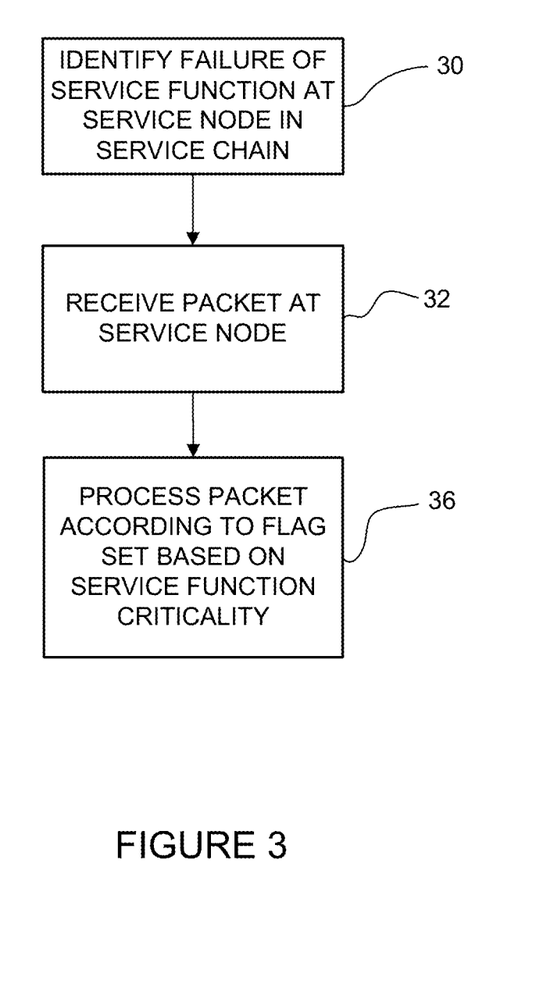
FIG. 3 is a flowchart illustrating an overview of a process for selective service bypass in a service chain, in accordance with one embodiment.

FIG. 3 is a flowchart illustrating an overview of a process for selective bypass in service function chaining, in accordance with one embodiment. At step 30 a service node (e.g., router R2 in FIG. 1) in a service chain identifies failure of a service function 16 at the service node. The service node 10 receives packet 15 (step 32). The service node 10 processes the packet 15 according to a flag associated with the service function 16 and set based on a criticality of the service function (step 36). The flag may be set in the packet 15 received from an upstream node on the service chain (e.g., ingress node or immediate upstream service node) or in a table at the service node (e.g., FIB 28 in FIG. 2). The packet is processed according to an action assigned to the flag. The action may include, for example, dropping the packet, forwarding the packet, marking the packet, or any other action. If the packet 15 is not dropped, the service node may set a flag in the packet for the next downstream service node and then forward the packet. The packet 15 may already have a flag set for the next downstream service node, in which case the service node forwards the packet containing the flag. For embodiments in which the flag is set at a forwarding table at the service node, there is no need to insert a flag in the packet.

It is to be understood that the flowchart shown in FIG. 3 and described above is only an example and that steps may be added, combined, or modified, without departing from the scope of the embodiments.

Figure 7:
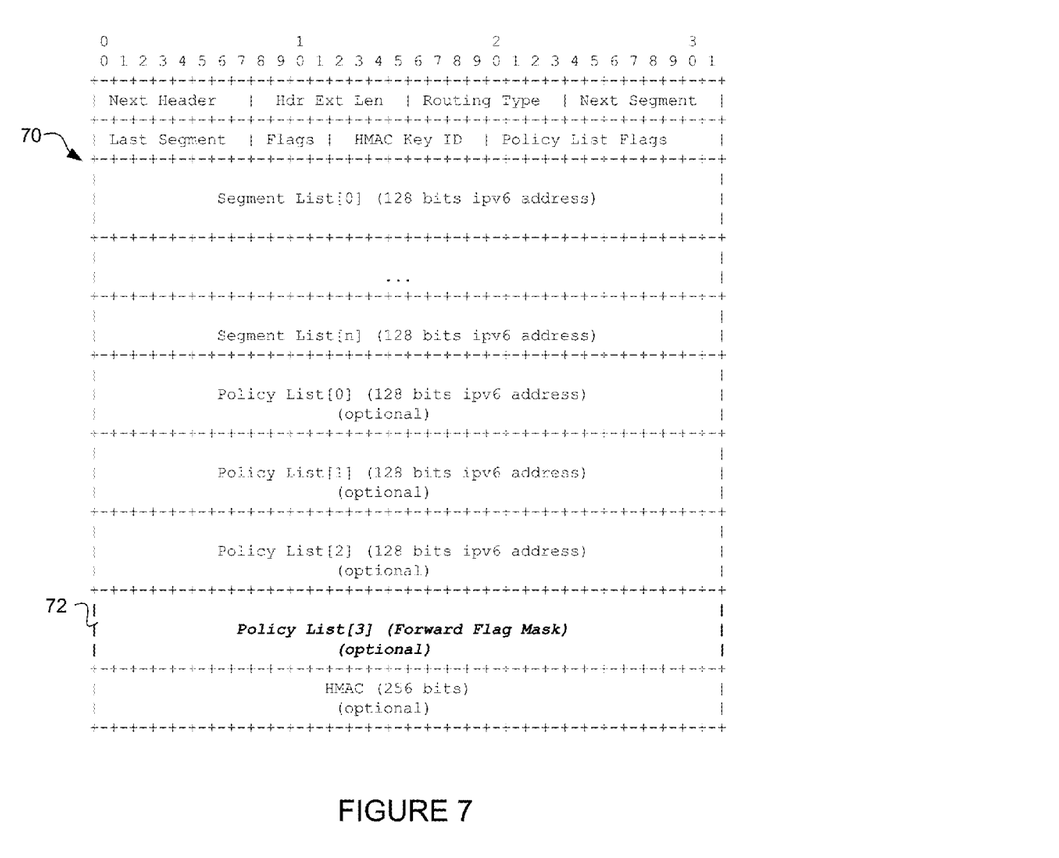
FIG. 7 illustrates an example of a segment routing header for use in selective service bypass, in accordance with one embodiment.
Figure 8:
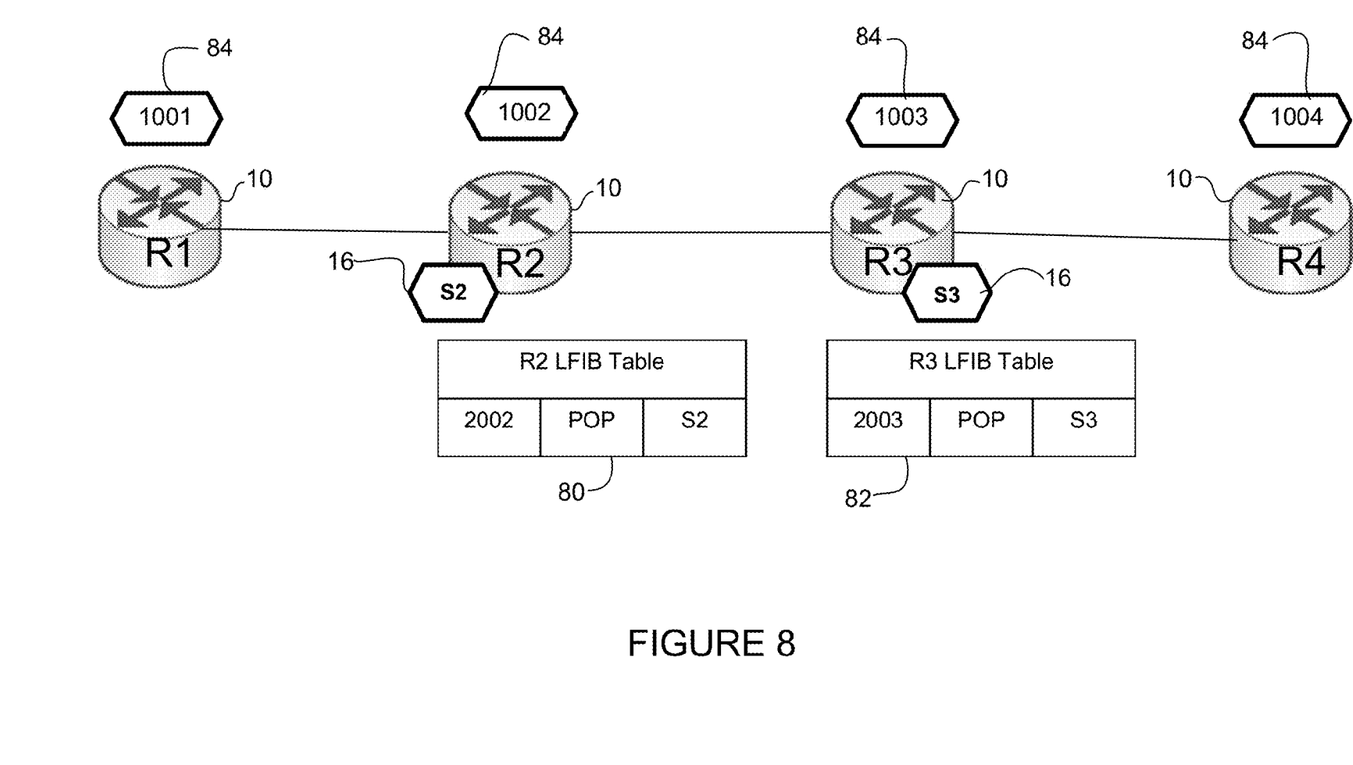
FIG. 8 is a diagram illustrating selective service bypass with MPLS (Multiprotocol Label Switching), in accordance with one embodiment.
Figure 9:
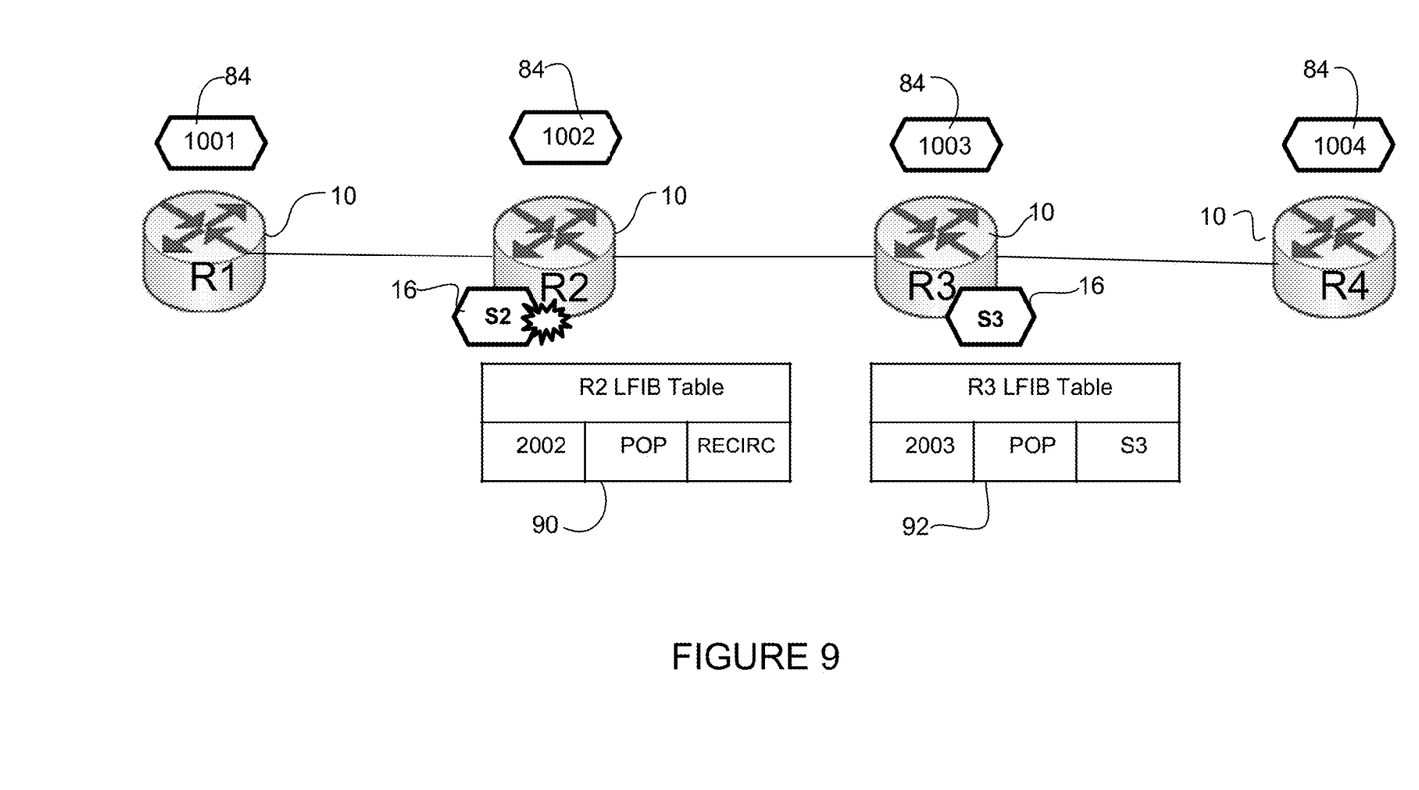
FIG. 9 illustrates selective service bypass in the network shown in FIG. 8 following a failure at one of the service functions.

The following examples describe implementation of selective service bypass in a service chain using NSH (FIGS. 4 and 5), segment routing on an IPv6 dataplane (FIGS. 6 and 7), and MPLS forwarding in segment routing (FIGS. 8 and 9). It is to be understood that these are only examples of protocols and mechanisms that may be used to implement the embodiments described herein and that other protocols or mechanisms may be used without departing from the scope of the embodiments.

Figure 4:
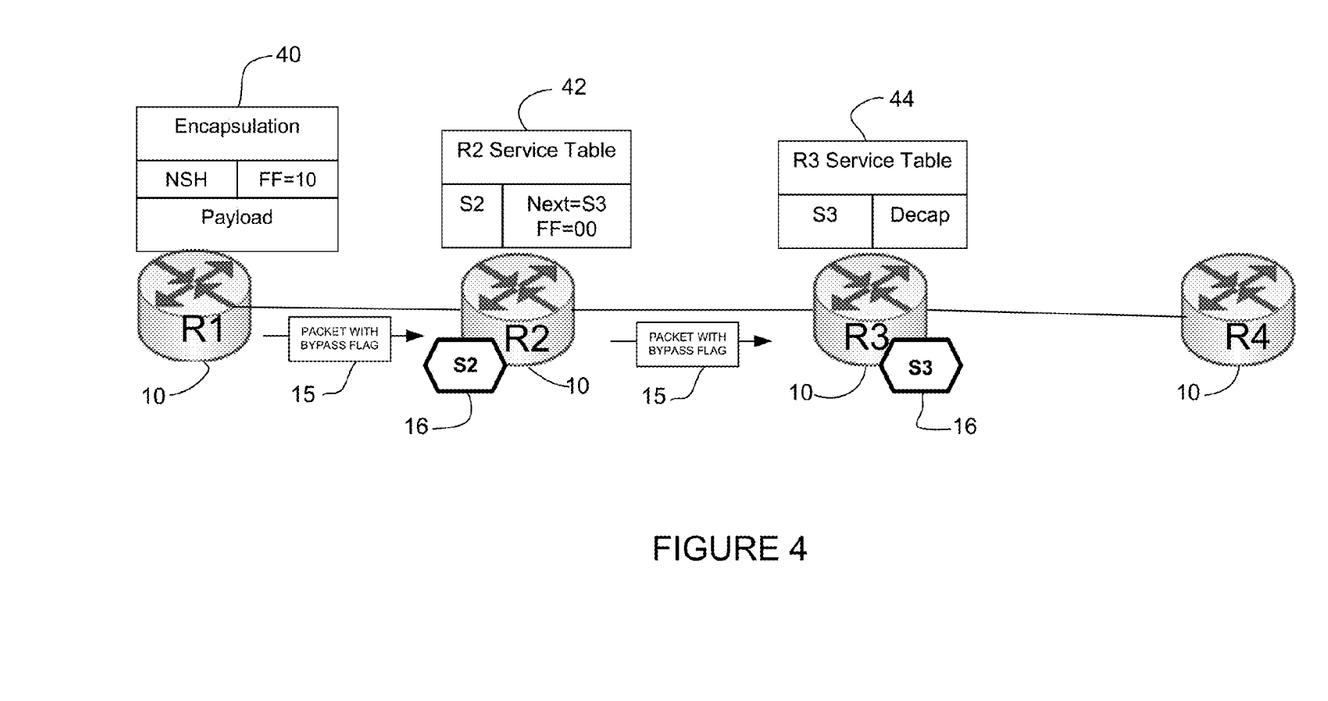
FIG. 4 is a diagram illustrating selective service bypass with a network service header, in accordance with one embodiment.

FIG. 4 illustrates selective service bypass with network service header, in accordance with one embodiment. The service chain shown in the example of FIG. 4 includes an ingress node R1, two service nodes R2, R3, and an egress node R4. Service nodes R2 and R3 are configured to perform service functions S2 and S3, respectively. In certain embodiments, the controller 18 (shown in FIG. 1), while instantiating the service path state entries in each service node (R2, R3) and ingress node R1, instructs a flag for the next service function. The ingress node R1 and service node R2 set flags in the NSH header based on the criticality of the service at the next (downstream) service node. In this example, service bypass is performed per service function (each service function within each service path) and the flag is reset at each service node.

The ingress node R1 may, for example, impose an NSH header 40 with service path ID and service index, which will follow a service path and apply a set of services. During normal operating conditions, the service node uses the service index field in the NSH to identify the service function and forward the packet for processing. In this example, service S2 is a non-critical service (e.g., monitoring service) and service S3 is a critical service (e.g., firewall). Based on the criticality of the service 16 at node R2, the controller 18 may instruct R1 to set the flag in the NSH to ignore the failed service at R2 and forward the packet 15 to the next service (FF=10 in service table 40). The controller 18 instructs R2 to set the flag in the NSH to drop the packet (flag=00 in service table 42) since R3 has a critical service function. R3 removes the NSH and forwards the packet to egress node R4 (per service table 44). If service S2 fails, R2 will ignore the failure and continue to forward the packet based on the bypass flag in the NSH. For example, service node R2 may decrement the service index in the NSH and forward the packet to the next service. If service S3 fails, R3 will drop the packet, based on the flag setting in the packet 15.

As previously described, the flag may be set based on the criticality of the associated service. In one embodiment, flag values are defined as follows:
00—Drop the packet
01—Remove NSH header and apply reclassification
10—Ignore the failed service and forward to next service
11—Remove NSH header and forward as legacy.

Services such as firewall, NAT, etc. may be marked as critical (e.g., FF=00), while services such as monitoring, accounting, and billing, or experimental services may be marked as non-critical (e.g., FF=10). A network administrator or operator may define whether or not a service is critical. It is to be understood that the 2 bit forward flag described above, is only an example and that other indicators may be used for the flag.

Figure 5:
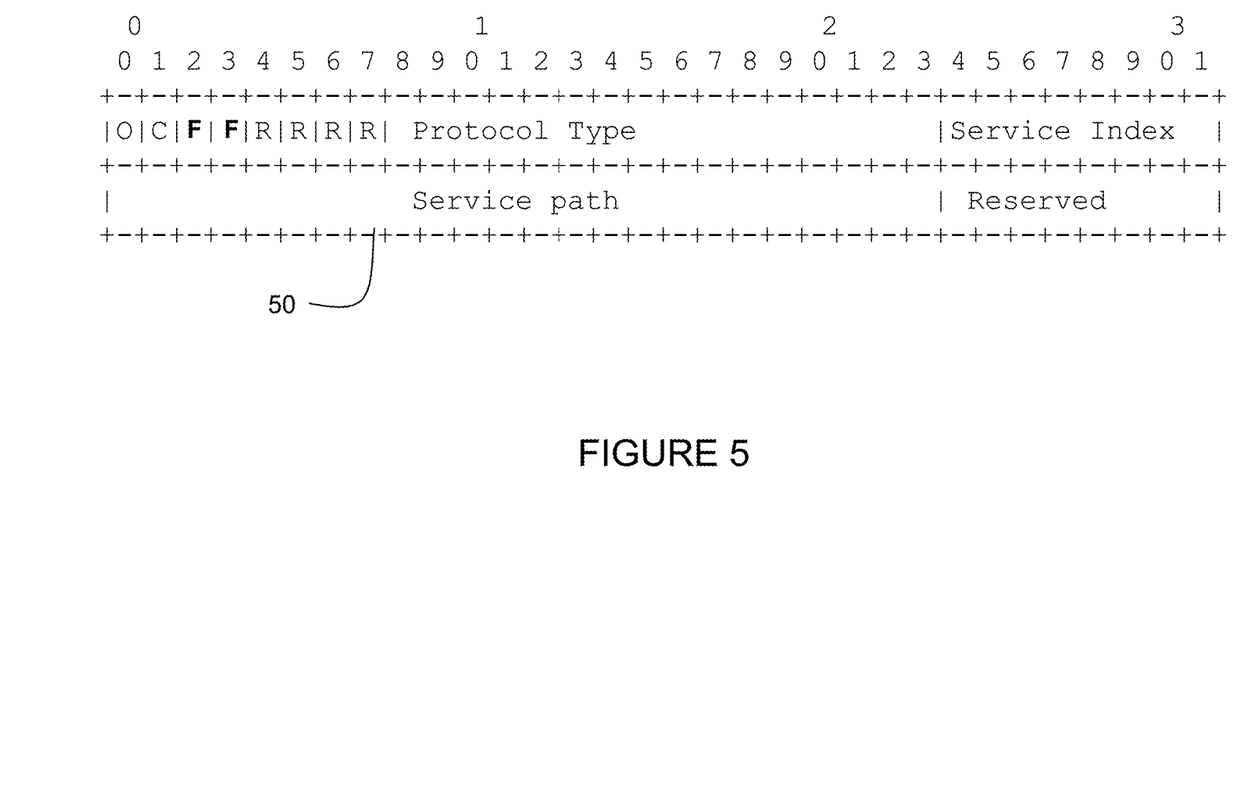
FIG. 5 illustrates an example of a network service header for use in selective service bypass, in accordance with one embodiment

FIG. 5 illustrates an example of a network service header format that may be used to transmit the flag, in accordance with one embodiment. In one example, the network service header 50 is composed of a base header, service path header, and context headers (not shown). The flag may be inserted, for example, into one of the reserved fields in the NSH base header (indicated at F in FIG. 5). The network service header may be, for example, a network service header as described in IETF Draft "Network Service Header", P. Quinn et al., Jul. 3, 2014. It is to be understood that this is only an example and that other formats may be used without departing from the scope of the embodiments.

In certain embodiments, each ingress node may include a per class forward flag inserted into a context header. In this example, service bypass is performed per service class and does not need to be reset at each service node. The criticality of each service may be split into high, medium, low (for critical services), and non-critical. Each service node 10 may be instructed by the controller 18 (during service path instantiation, for example) about the criticality class for each local service. If the service function is not available when the service node receives the packet, it uses the local class and the per class forward flag context to identify the respective action to be performed.

In one example, the flag comprises an 8 bit value. The context header may be, for example:

SP1—00 11 11 10 wherein:

Bit 0 and Bit 1 represent the action to be performed when a service is non-critical;

Bit 2 and Bit 3 represent the action to be performed when a service is low critical;

Bit 4 and Bit 5 represent the action to be performed when a service is medium critical; and Bit 6 and Bit 7 represent the action to be performed when service is high critical.

Figure 6:
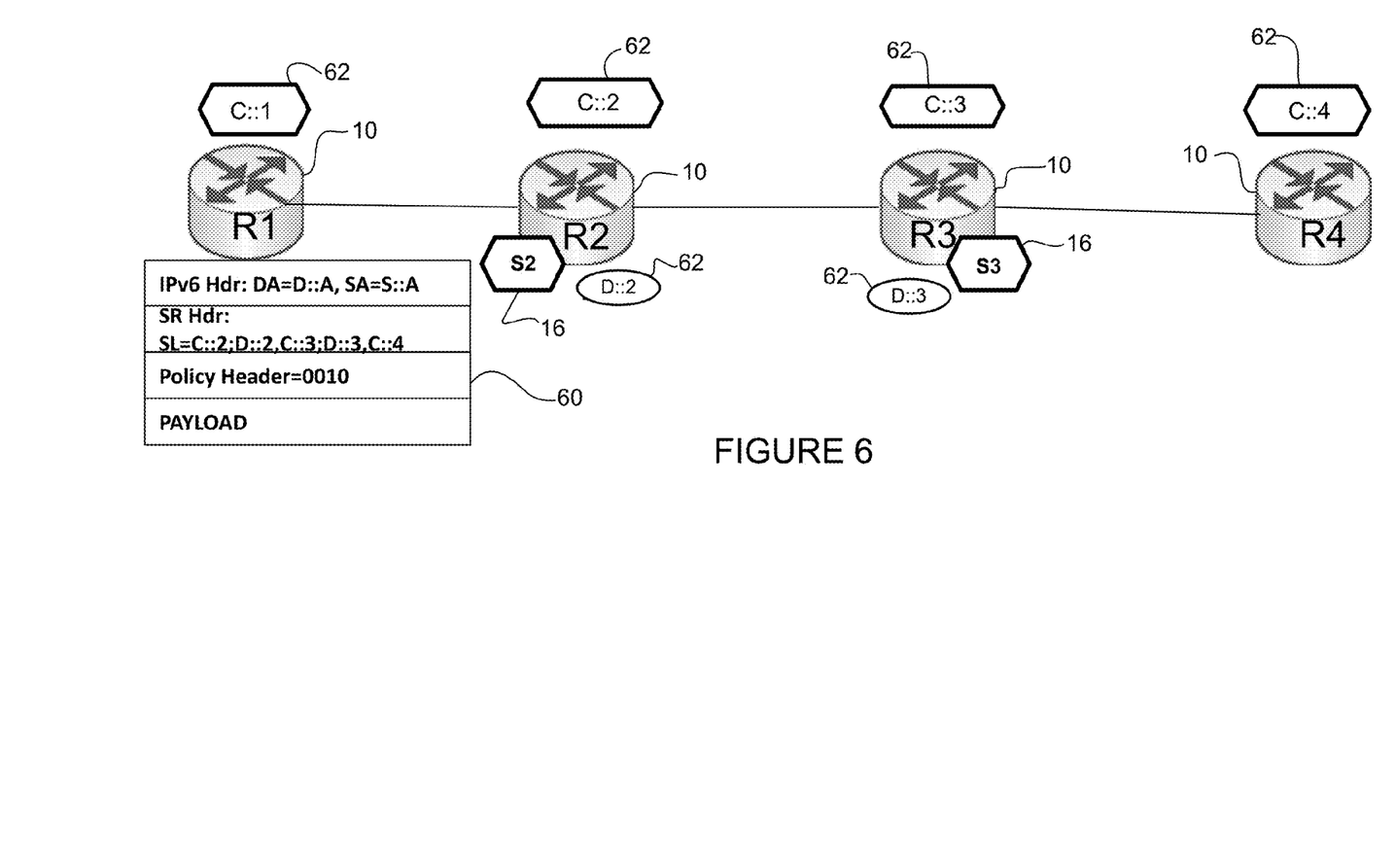
FIG. 6 is a diagram illustrating selective service bypass with segment routing, in accordance with one embodiment.

FIG. 6 illustrates an example of selective bypass in a service chain with segment routing, in accordance with one embodiment. In one example, IPv6 segment routing is used and a flag is set in the IPv6-SR policy header so that packets are selectively dropped or forwarded based on the criticality of the failed service. Selective forwarding/bypass may be provided per-service-path-per-service.

In the example shown in FIG. 6, the service path includes an ingress node R1, service nodes R2, R3, and egress node R4. Service nodes R2 and R3 include service functions S2 and S3, respectively. The ingress node R1 may, for example, send a packet with <C::2><D::2><C::3><D::3><C::4> as a segment list in an extension header, where segment IDs 62 are as follows:

C::2→node R2
D::2→service S2
C::3→node R3
D::3→service S3
C::4→node R4

In certain embodiments, a flag (referred to herein as a flag mask) is inserted in a policy header to indicate the action to be performed in case of service failure at service nodes in the service chain. For example, as shown in FIG. 6, the ingress node R1 includes a flag mask policy header while imposing a segment routing extension header (SR EH) in packet 60.

In one example, the forward flags are defined as follows:

00—Drop the packet
01—Remove SR header and apply reclassification on the packet
10—Ignore the failed service and forward to next service
11—Remove SR header and forward as legacy.

When a service node detects a service function failure, the node checks the flag mask to identify the respective flag and takes the appropriate action. For example, the service node may drop the packet if the flag is set to 00, decrement the service index in NSH base header (if present) and forward the packet to the next service if the flag is set to 10, or remove the NSH and perform reclassification (and if needed append a new header) if set to 01.

In certain embodiments, the controller 18 (FIG. 1) may instruct the ingress node R1 with service path details and include a flag (flag mask), which the ingress carries in the policy header. For example, when the controller 18 instantiates the service path and segment list to ingress node R1, it may include the flag mask to be set as the policy header in the SR extension header. The ingress node R1 may set the flag mask policy header in the segment routing extension header based on the local table while sending out the packet to the next service function. For example, the ingress node R1 may append the segment routing extension header and include the flag mask as a new policy header (shown at 60 in FIG. 6).

In one example, each 2 bits in the flag mask represents an action for each service. The policy header may be, for example, 128 bits, in which case, the header can carry details for 64 services.

In one embodiment, a next segment pointer may be used to identify the position in the forward flag mask policy header to identify the action to be performed. Any service node can use the next segment pointer and flag mask to identify the criticality of the service and take necessary action if the service is not available.

In the example shown in FIG. 6, the service chain includes two service functions (S1, S2). The flag mask in the policy header may be set, for example, to 0x0000 0x0000 0x0000 0x0000 0x0000 0x0000 0x0000 0x0002 by R1 to indicate the following:

Bit 0 and Bit 1→1st Service Function (S2) set to 10 indicates "Forward", Bit 2 and Bit 3→2nd Service Function (S3) set to 00 indicates "Drop", etc.

The service node 10 may also use an out of band mechanism, upon detecting the service failure, to indicate the failure to the controller 18. At this point, the service node may refrain from propagating the service failure via IGP (Interior Gateway Protocol). Once the node receives a confirmation from the controller 18, it may wait for a local timer to expire and then propagate the same information. This will give enough time for the controller 18 to change the segment stack and instruct the ingress node to use the new segment stack.

FIG. 7 illustrates an example of a policy header, generally indicated at 70, for use in transmitting the flag mask, in accordance with one embodiment. In one example, the segment routing policy header is comprises a format described in IETF draft "IPv6 Segment Routing Header (SRH), S. Previdi et al., Jun. 9, 2014. The flag mask may be inserted, for example, in the policy list as shown at 72 as shown in FIG. 7. It is to be understood that this is only an example and other formats may be used, without departing from the scope of the embodiments.

FIG. 8 illustrates selective service bypass with MPLS, in accordance with one embodiment. The nodes 10 and services 16 are each assigned a label 84. For example, the service chain in FIG. 8 includes ingress node R1 (label 1001), service nodes R2 (label 1002), R3 (label 1003), and egress node R4 (label 1004). Service nodes R2 and R3 include service functions S2 (label 2002) and S3 (label 2003), respectively. The service node may use the label to identify the service and forward the packet for processing.

In the example shown in FIG. 8, ingress node R1 may transmit a packet with label stack <1002><2002><1003><2003>. The labels represent that 1002 is to reach R2, 2002 is to identify S2 by R2, 1003 is to reach R3, and 2003 is to identify S3 by R3. In one embodiment, a flag (e.g., continue flag, drop flag, reclassify flag) may be inserted into the dataplane to selectively drop or forward packets based on the criticality of the service. The flag may be inserted, for example, into the LFIB (Label Forwarding Information Base), as described below.

Each service node, while assigning a segment/label for the associated service function, may determine the criticality of the service at the node based on local/operator configuration. Services such as firewall and NAT are marked as critical, while monitoring, accounting, and the like are marked as non-critical. In the following example, S2 is non-critical and S3 is critical.

During working conditions, the service node pops the label 84 and forwards the packet to the service 16 for packet processing as shown in the R2 LFIB tables 80, 82 in FIG. 8.

In the case of a service failure, depending on the service criticality, the control plane may instruct the dataplane to remove the label or mark a continue flag and retain the label in the LFIB. For example, upon detecting the service function failure, the service node may: mark a drop flag in the dataplane for the service label if the service is critical; mark a continue flag in the dataplane for the service label if the service is non-critical; or mark a reclassify flag in the dataplane for the service label if the service is critical and needs additional consideration before deciding whether to drop or forward the packet. If service S2 is down, the R2 control plane may instruct to mark continue flag so that 2002 will be popped and forwarded towards the next label R3. If service S3 is down, the R3 control plane may remove the label so that any packet destined to S3 will be dropped.

In certain embodiments, the drop flag is equivalent to removing the label from the LFIB, the continue flag is equivalent to retaining the label in the LFIB and marking as recirculate (recirc), and the reclassify flag is equivalent to setting a virtual interface as egress (which leads to a reclassify process). The recirculation indicator is used to mark the dataplane to keep forwarding the packet instead of dropping the packet.

FIG. 9 illustrates failure of service function S2 at service node R2. In this example, R2 may retain the label and mark as recirculate, as shown at R2 LFIB table 90. Service node R2 pops the label, recirculates the packet and forwards the packet based on underlying label to next service node R3. Service node R3 performs normal operations on the packet according to its LFIB table 92.

The service node R2 may use an out of band mechanism to indicate the failure to the controller 18. At this point, it may refrain from propagating the service failure via IGP (or LDP). Since the service function failure is propagated to other ingress nodes via any existing control plane (e.g., from centralized server that tracks each function or via IGP), the label may be retained in the LFIB for a few minutes to allow for convergence. For example, service node R2 may retain the failed service label in the LFIB with the continue flag until service S2 comes up or for a time that allows the ingress to perform IGP convergence or a vSOC (virtual systems operation center) detects the failure and instructs the ingress node R1 to use a different available service node. Once the node 10 receives a configuration from the controller 18, it may wait for a local timer to expire and then propagate the same. This will give sufficient time for the controller 18 to change the label stack and instruct the ingress node to use the new label stack.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   identifying a failed service function at a service node in a service chain, said service chain defining a set of service nodes hosting service functions and an order for applying said service functions, each of said service functions identified as critical or non-critical at a controller in communication with said service function chain;
   receiving a packet at the service node comprising the failed service function, the packet comprising a flag located in a network service header or segment routing header and identifying an action to be taken on the packet, wherein the flag is set based on whether the failed service function is one of the service functions identified as critical or one of the service functions identified as non-critical; and
   processing the packet at the service node according to the flag;
   wherein said service functions identified as critical comprise service functions critical to network traffic flow and said service functions identified as non-critical comprise informational service functions and are defined as critical or not critical in the controller.

2. The method of claim 1 wherein the flag is located in the received packet and set by an upstream network device in said service chain and wherein said upstream network device sets the flag based on information from the controller.

3. The method of claim 1 wherein the flag indicates that the packet should be dropped if the failed service function is identified as critical or indicates that the failed service function should be ignored and the packet forwarded to the network service function if the failed service function is identified as not critical.

4. The method of claim 1 wherein the service functions identified as critical comprise a firewall or a network address translation and wherein the service functions identified as non-critical comprise monitoring, accounting, billing or experimental services.

5. The method of claim 1 wherein the flag is located in a segment routing header and the flag comprises a flag mask in a policy header, the flag mask comprising the flag for each of said service functions in said service chain.

6. The method of claim 1 wherein the flag is inserted into a forwarding table at the service node in an MPLS (Multi-protocol Label Switching) dataplane.

7. The method of claim 1 wherein said service function is identified as critical or non-critical based on input from a network operator at the controller.

8. The method of claim 1 further comprising inserting a new flag in the packet based on a downstream service function criticality and forwarding the packet.

9. An apparatus comprising:
   a processor for identifying a failed service function at the apparatus, and processing a packet received at the apparatus according to a flag associated with the service function and set based on whether the failed service function is identified as a critical service function or a non-critical service function, the flag located in a network service header or segment routing header; and
   an interface for transmitting packets in a service chain, said service chain defining a set of service nodes hosting service functions and an order for applying said service functions, each of said service functions identified as critical or non-critical at a controller in communication with said service function chain;
   wherein said service functions identified as critical comprise service functions critical to network traffic flow and said service functions identified as non-critical comprise informational service functions and are defined as critical or not critical in the controller.

10. The apparatus of claim 9 wherein the flag is located in the received packet and set by an upstream network device in said service chain.

11. The apparatus of claim 9 wherein the received packet comprises the flag in a network service header.

12. The apparatus of claim 9 wherein the received packet comprises the flag in a segment routing header.

13. The apparatus of claim 9 wherein said critical service functions and said non-critical service functions belong to criticality classes.

14. The apparatus of claim 9 wherein the flag is inserted into a forwarding table at the service node in an MPLS (Multiprotocol Label Switching) dataplane.

15. The apparatus of claim 9 wherein the processor is further operable to insert a new flag in the packet based on a downstream service function criticality and forward the packet.

16. Logic encoded on one or more non-transitory computer readable media for execution and when executed operable to:
  identify a failed service function at a service node in a service chain, said service chain defining a set of service nodes hosting service functions and an order for applying said service functions, each of said service functions identified as critical or non-critical at a controller in communication with said service function chain; and
  process a received packet comprising a flag identifying an action to be taken on the packet, wherein the flag is set based on whether the failed service function is one of the service functions identified as critical or one of the service functions identified as non-critical; and
  wherein said service functions identified as critical comprise service functions critical to network traffic flow and said service functions identified as non-critical comprise informational service functions and are defined as critical or not critical in the controller.

17. The logic of claim 16 wherein the flag is set in a dataplane.

18. The logic of claim 16 wherein service functions associated with security or routing are classified as critical service functions and informational service functions are classified as non-critical service functions.

19. The logic of claim 18 wherein said processing comprises dropping the packet for a critical service function or forwarding the packet for a non-critical service function.

20. The method of claim 1 further comprising contacting the controller to determine if a downstream service function is identified as critical or non-critical and inserting a new flag in the packet based on whether said downstream service function is critical or non-critical.

* * * * *